H. KNIGHT.
PROCESS OF AND APPARATUS FOR SOIL TREATMENT.
APPLICATION FILED MAR. 10, 1921.
Reissued July 12, 1921. 15,151.
3 SHEETS—SHEET 1.
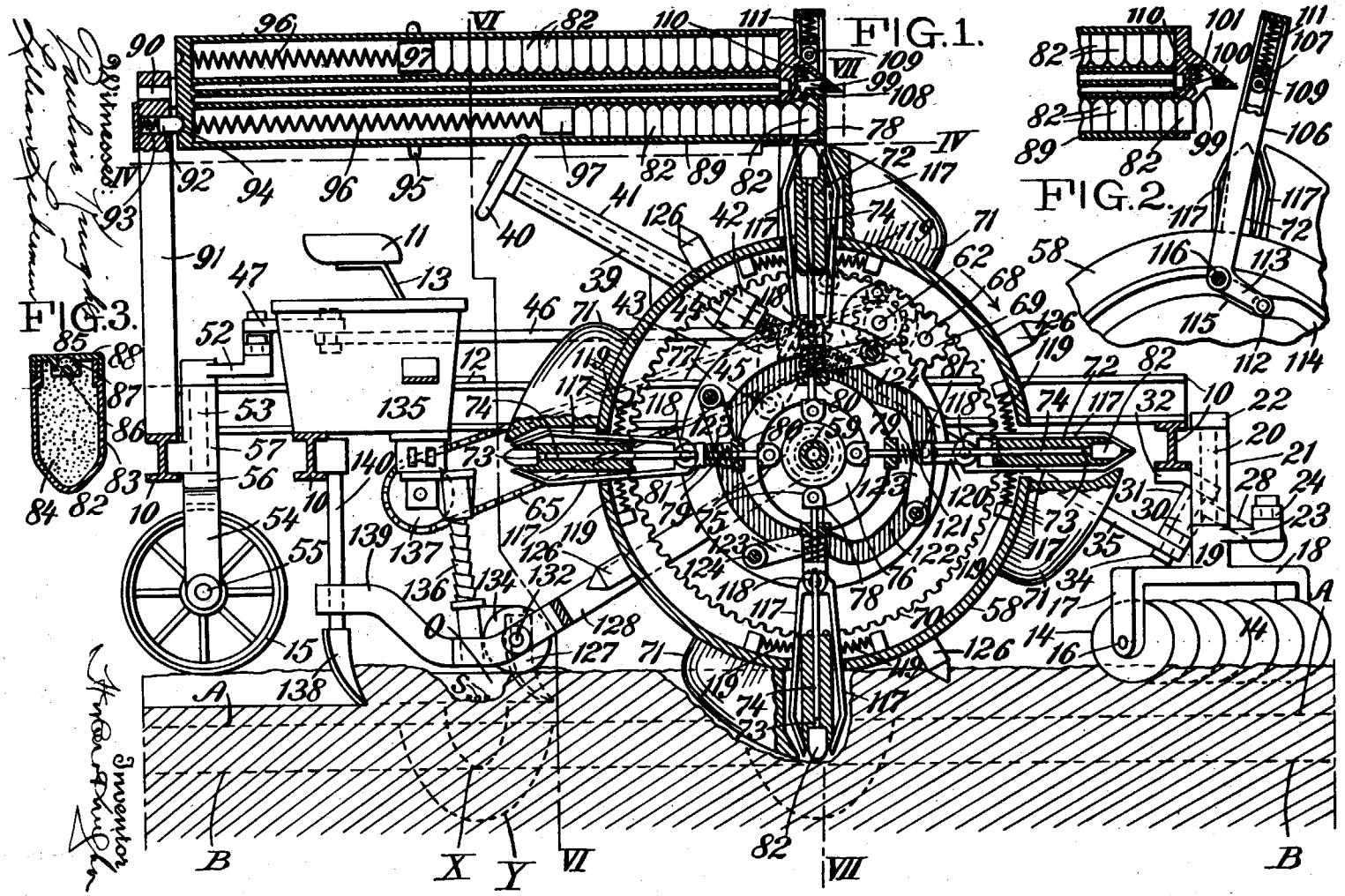

H. KNIGHT.

PROCESS OF AND APPARATUS FOR SOIL TREATMENT.

APPLICATION FILED MAR. 10, 1921.

Reissued July 12, 1921. 15,151.

3 SHEETS—SHEET 2.

Witnesses:
Pauline Knight
Lillian Lieberman

Inventor
H. Knight

H. KNIGHT.
PROCESS OF AND APPARATUS FOR SOIL TREATMENT.
APPLICATION FILED MAR. 10, 1921.
Reissued July 12, 1921. 15,151.
3 SHEETS—SHEET 3.
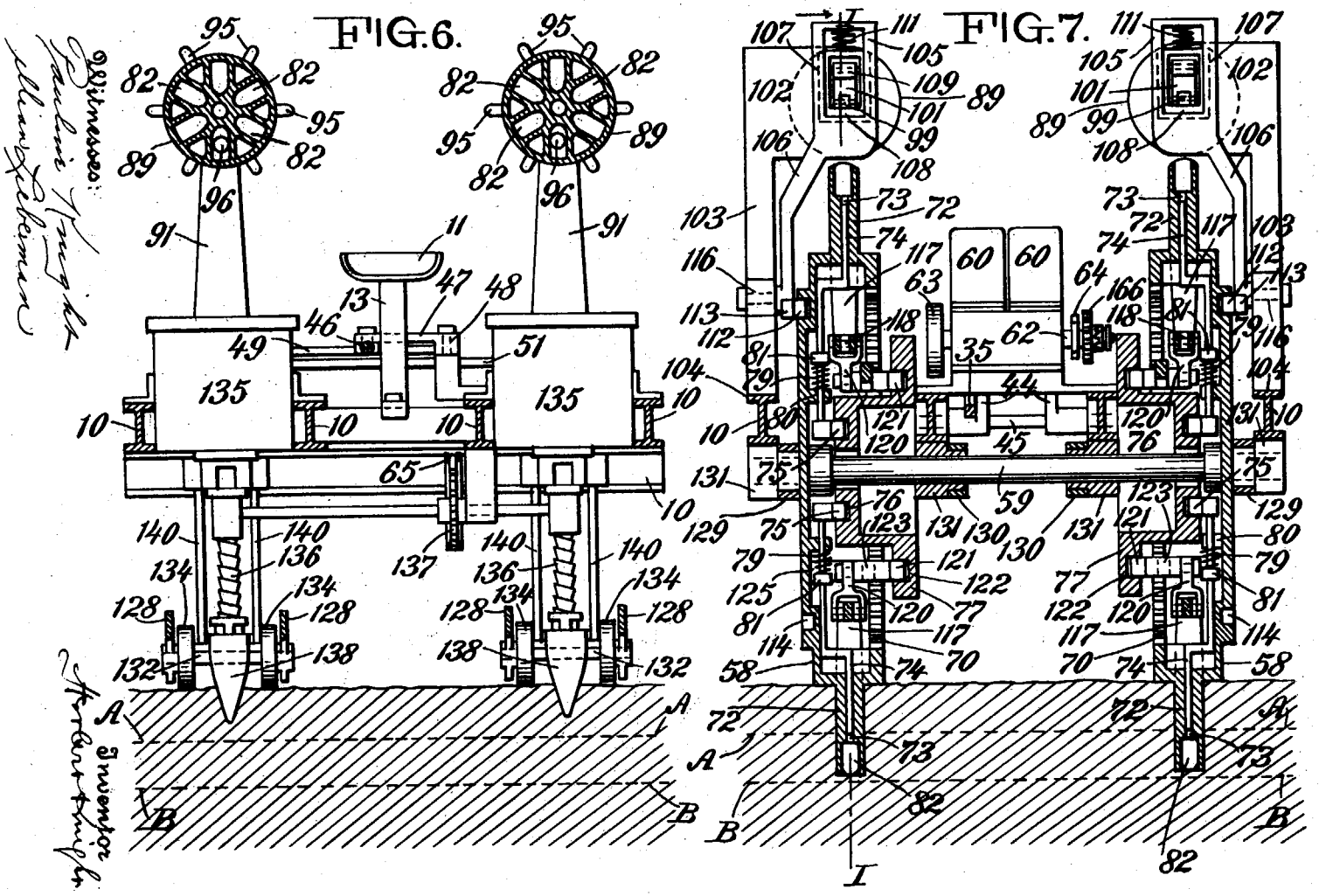

UNITED STATES PATENT OFFICE.

HERBERT KNIGHT, OF NEW YORK, N. Y.

PROCESS OF AND APPARATUS FOR SOIL TREATMENT.

15,151. Specification of Reissued Letters Patent. Reissued July 12, 1921.

Original No. 1,359,177, dated November 16, 1920, Serial No. 305,173, filed June 18, 1919. Application for reissue filed March 10, 1921. Serial No. 451,286.

*To all whom it may concern:*

Be it known that I, HERBERT KNIGHT, a citizen of the United States of America, residing in the borough of Manhattan, city of New York, county and State of New York, have invented certain new and useful Processes of and Apparatus for Soil Treatment, of which the following is a specification.

This invention relates broadly to a new process and apparatus for soil treatment, and specifically to the art of agriculture, having reference generally to the art of employing certain novel instrumentalities for increasing the fertility of the soil and the consequent growth of vegetation; the invention can be utilized not only in the art and practice of agriculture, however, but can be employed in the ditching and drainage of land and for military purposes as will be explained.

It is a well known fact that it is most desirable, in order to produce an increment above the normal yield of any particular soil, to penetrate with the plow, or other implement of tillage, to a depth commensurate with the natural requisition of the root area; if it falls short of this, if in fact the implement fails to loosen and disturb the soil sufficiently to properly receive, and retain, the rainfall so as to conserve the moisture according to the necessities of the particular vegetation, the agencies employed are inadequate and the best results possible are therefore not achieved.

To the above ends, my present invention consists broadly speaking, in a novel process of employing gas expanding compounds, for tillage purposes, such as plowing the soil, or subsoil, cultivating and harrowing, distributing fertilizing compounds or material, placing or planting seed, providing for greater aeration of the soil, storing and rendering moisture more available, assisting and accelerating the operation of the nitrifying microbe and otherwise benefiting plant growth, as will be explained.

In reducing this invention to commercial use variously modified instrumentalities may be employed according to the particular problem, or problems, which different conditions and requirements present as well as the phase of activity to which my process may be directed; the value and potency of my present invention residing largely in the regularity of the deposition of the packages containing the gas expanding compounds.

In order to explain my invention more fully I will proceed to describe it in connection with the accompanying drawings; by means of these drawings I illustrate one form of apparatus for carrying my invention into practical effect; the implements and instrumentalities herein shown however may be widely varied without departing from the scope and spirit of my invention; in fact any suitable instrument, or implements, may be employed in the utilization of my process.

In these drawings—

Figure 1 represents a longitudinal section on the line I—I Fig. 7; in this view I show a body of soil in the process of cultivation, with the implement for carrying my invention into effect in operation; the process hereinafter claimed, the orderly procedure and periodicity are illustrated in this figure.

Fig. 2 is a detail view.

Fig. 3 is a detail sectional view to a larger scale of the high explosive package which I employ herein.

Fig. 6 is a transverse section on the line VI—VI, Fig. 1.

Fig. 7 is a transverse section on the line VII—VII, Fig. 1.

Figures 4, 5:
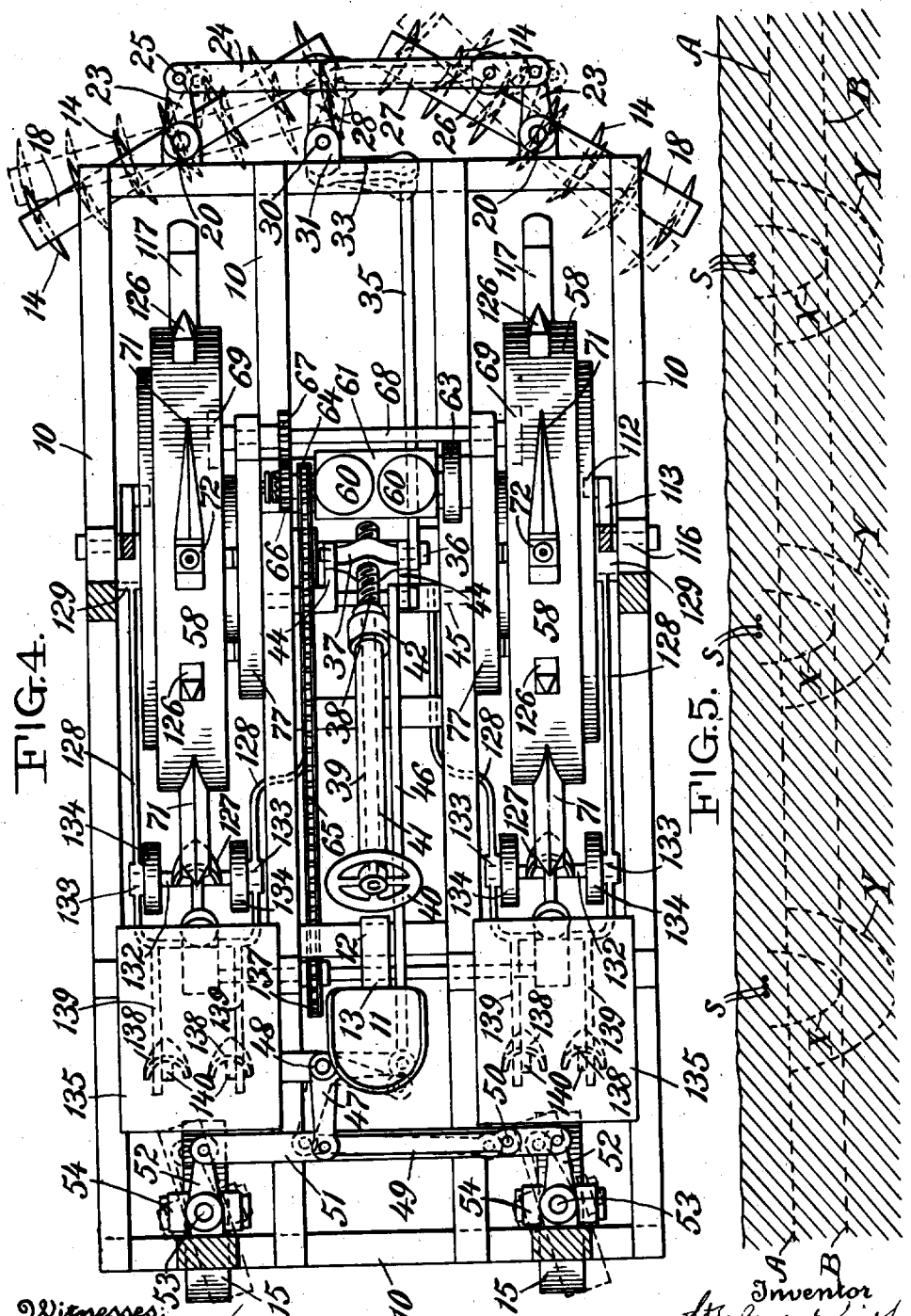
Fig. 4 is a horizontal section on the line IV—IV, Fig. 1.
Fig. 5 shows the soil after the completion of my process of operation with the seed in position.

In these drawings 10 represents a frame, preferably of steel and consisting of longitudinal and transverse beams attached each to the other in any suitable manner and forming a compact structure rectangular in shape; a seat for the operator is provided at 11 and said seat is supported on the longitudinal frame piece 10 at 12 by means of the spring support 13.

It is my intention in carrying into practical effect the implement herein shown to provide such various facilities so that the said implement can be governed and directed by a single operator; this factor makes for economy and is therefore important.

The implement is partially supported by gangs of disk plows 14 at the forward end and by wheels 15 at the rear; the latter are here shown two in number, see Figs. 1 and 4 and the former are shown in two sets or gangs; in addition to partially supporting the implement the disk plows 14 and the rear wheels 15 are means for guiding the implement to the right or left.

The disk plows are supported on central shafts 16 turning in the downwardly extending arms 17 of the frames 18. The frames 18 have centrally located trunnions 19 with pintles 20 of diminished size extending upwardly through thimbles 21, see dotted lines Fig. 1, the pintles being provided with retaining caps 22 confining all said parts snugly in position and permitting the frames 18 which carry the disk plows 14 to swing around, to swivel in fact with the pintles 20 as the centers; the thimbles 21 are secured to the frame pieces 10 in any suitable manner.

Arms 23 extend laterally from the trunnions 19 and are connected by transverse bar 24 by pins 25 affording a turning movement. This bar 24 is connected by pin 26 to bar 27 which latter is swiveled to an arm 28 of a bell crank lever by means of pin 29; this bell crank lever has a central pin 30 working in thimble 31 the latter being secured to bracket 32 hung from the main frame 10; the other arm 33 of the bell crank lever is connected by a pin 34 to the link 35 which latter extends upwardly and rearwardly and is pivotally secured at 36 to a traveling nut 37; extending through the latter is the screw 38 which is on the forward end of rod or shaft 39. This latter has at its rear end the operating handle or wheel 40 accessible to the operator seated at 11. The rod or shaft 39 is provided with a sleeve 41 which latter is secured to a ring 42 mounted upon and supported by an arm 43 attached to the main frame of the machine.

The traveling nut 37 is secured at point 36 to bell-crank levers 44 turning on pin 45.

Extending rearwardly from the rear member of one of the bell-crank levers 44 is a bar 46 swiveled to horizontally swinging bell-crank lever 47 the latter being secured to and turning in the frame of the machine by means of pivot pin 48; the other arm of the bell crank lever is pivotally attached to the floating bar 49 which latter at its further end is pivotally secured at 50 to the connecting link bar 51 which extends between and is pivotally connected to the front ends of the forwardly extending arms 52; these latter are secured to the upper ends of pintles 53; these pintles are the upper terminals of the yokes 54 which latter extend down and on both sides of each of the rear wheels 15 being connected thereto by pins 55; the yoke pieces 54 have shoulders 56 upon which seat the thimbles 57 of the main frame 10.

It will be seen that as the bar 46 is pushed back the bell crank lever 47 will turn on the point 48 and the said bell crank lever will assume the position shown in dotted lines in Fig. 4. This will cause the connecting link bar 51 to move to the left and through the medium of the intermediary parts to throw the wheels to the dotted position shown in same figure; these are all conventional constructions and may be readily understood without extended description.

The guiding and steering elements at the rear of the implement will operate in consonancy with the corresponding elements at the forward end.

I will proceed now to describe those parts of the implement especially designed for its propulsion, the mechanism employed to introduce the explosive package as well as the parts which act as soil distributers, seed planters and coverers; these are all coöperating instrumentalities and constitute when assembled and properly working an organized implement fitted to discharge a large number of functions in effectual sequence.

At 58 I show two wheels mounted centrally on the axle 50. At 60 are motors mounted upon bed plate 61 secured to the main frame 10. These motors may be of any suitable construction but in the present instance are ordinary gasolene engines. The engine shaft is shown at 62, fly wheel at 63; at 64 is a sprocket wheel operating a sprocket chain 65 hereinafter referred to. At 66 is a gear wheel meshing with a similar wheel 67 mounted upon and turning with shaft 68; this latter is provided at each end with gear wheels 69 which intermesh with the inside gears 70 of the wheels 58; by the operation of the aforesaid parts rotation is given to the said wheels 58; this rotation is in the direction of the arrow shown in Fig. 1.

The wheels 58 constitute the traction members of my improved implement; with this end in view I provide on their bearing faces certain members which penetrate the soil; of these I show at 71 soil penetrating or plow members; at the place they enter the soil they are pointed, provided in fact with a cutting edge, and toward the rear they widen out; they thus operate like plows as well as increasing the traction of the wheel.

As I employ the plow-tractor members 71 they serve more particularly to open the soil locally and at the places where the seed is to be deposited; they also pave the way for what I will term herein the cannon; that is the implements which I employ for receiving, carrying and discharging the explosive packages into the soil.

These cannon are shown in section in Fig. 1; they consist of centrally disposed members 72 with a middle bore 73 in which operates a plunger 74; this plunger is swiveled at its inner end to the block 75 traveling in spiral groove 76 of the circular frame 77 secured from rotation or other movement by being attached in any suitable place and manner to the main frame 10.

The groove 76 which controls the movements of the plunger 74 is as stated irregular or spiral in shape; in Fig. 1 the lowermost of the blocks 75 has reached the edge or corner 78 of the said spiral groove and a slight further movement of the wheel 58 in the direction of the arrow will permit the said block 75 to drop off this corner being impelled in this movement by the spring 79 which bears at the top against stud 80 on the wheel 58 and at the bottom against the button 81 on the plunger 74.

When the block 75 drops off the corner 78 of the groove 76, the spring 79 thrusts the plunger 74 outwardly and it quickly descends and strikes the cartridge 82 exploding it; by this explosion I increase the area of soil disturbance at those localities where I purpose depositing the seed.

It will be seen from the foregoing that I have described detailed means for periodically functioning the cartridge which means are fully shown in the drawings presenting an operative proposition.

To illustrate, and referring to Fig. 1 again, I show the soil in longitudinal section; that part of the soil above the line A—A, I refer to as the top soil, that which is usually employed in tillage; the portion of the soil between the lines A—A and B—B, I refer to as hard pan, a condition occurring at many places in this country and constituting a continuous menace to the farmer as placing an almost impassable barrier to the downward growth of the plant roots; it is one of the objects of my present invention to penetrate this hard pan at such points and at such places where I intend subsequently placing the seed for the proposed crop; the penetration of this hard pan may be accomplished partly by the plow members 71 and partly and finally by the explosion of the cartridge 82. When the cartridge is exploded it disturbs the soil substantially between the curved lines X Y; the result is a pocket which operates to conserve the rainfall and permit also the easy penetration of the plant roots at this point; furthermore as will be seen the area disturbed extends quite a distance below the hard pan whose lower level is indicated by the line B—B. Beneath this hard pan is a subsoil which contains important and valuable plant food and which under the ordinary methods of tillage is never rendered available for this purpose; I, by my improved method open it up for the first time in a scientific manner and on an extensive scale and at the same time I economize in energy expended as I limit the operations to circumscribed areas—the local points or places intended for immediate use.

The explosive unit illustrated here by the cartridge 82 can be made up in any desired manner; I show an outer cover 83 containing the high explosive 84; at 85 I show a detonator with an anvil plate at 86 a cap at 87 and cover piece at 88; this is all shown in detail in the cross section Fig. 3.

I will proceed to describe the means for introducing or feeding these cartridges or high explosive packages to the cannon 72. At 89 I show two cylinders; these constitute magazines or containers for the cartridges or high explosive packages. These cylinders or magazines are shown to advantage in cross section Fig. 6 and longitudinal section Fig. 1. They are provided with pivots or turning points 90, one at each end, which are supported by and turn in standards 91 rising from the main frame 10 of the machine; pins 92 controlled by springs 93 cooperating with detents 94 serve to retain the magazine to the position at which it is thrown and this latter is accomplished by the operator seated at 11; the said operator, see Fig. 6, can by taking hold of the handles 95, and giving same a sharp jerk move the cylinder and advance it to another position; each magazine contains six rows of cartridges and when these are all exhausted the cylinder can be taken down and reloaded; but with the device and arrangement as shown an extensive field can be operated upon before reloading becomes necessary.

One of the requisites of my herein described implement is the periodic introduction of the cartridges into the cannons as they move around with the wheels 58 and to effect this it will be seen referring to Fig. 1 that the forward ends of the magazine are coincident; in line with the mouths of the cannon when the latter reach the zenith of their swing; this propinquity enables the easy and immediate transfer of the cartridge from the magazine to the cannon; part of the machinery therefor is shown in the detached view Fig. 2.

When the parts have reached the position shown in Fig. 1 the cartridge 82 which provides a definite explosive charge and is located at the extreme right lower tier of the cylinder 89 is about to be deposited in the mouth of the cannon 72 now open and immediately below same; the springs 96 and followers 97 are utilized to keep the cartridges moving toward the outer end of the cylinder when the supply of any one tier is drawn upon; by this means and in this manner the particular cartridge just referred to is positioned to drop through the opening 98 into the arrested and upwardly turned cannon.

This cartridge is ordinarily held to its position in the cylinder by means of a latch 99 pivoted at 100 to the extension 101 of the shoulder 102 forming the upper part of the standard 103, which latter is secured at its lower end to the main frame 10 at 104. See Fig. 7.

Coöperating with these parts is a yoke 105 supported on an arm 106 operated by means hereinafter described. This yoke is provided with a frame 107 having an arm 108 which as the frame moves upwardly strikes against the latch 99 raising same and thus removing the detaining instrument of the cartridge 82.

This position is shown in Fig. 1 and the cartridge has commenced to drop into the cannon as before explained; the above mentioned upward movement of the frames is brought about as follows: referring to Fig. 2 as the arm 106 moves backward toward the magazine 89, the roller 109 moves up on the inclined surface of the extension 101; the said roller being mounted in the frame 107 draws the arm 108 up with it. When the arm 106 is thrown from the position shown in Fig. 1 to the position shown in Fig. 2, the spring 110 will thrust the latch 99 down and detain the succeeding cartridge and the spring 111 will return the frame 107 to its normal position.

The arm 106 is moved from one position to the other by means ofthe pin 112 secured at the outer end of the short arm 113 of the said arm 106; this pin travels in a groove 114 of the wheel 58; the said wheel traveling forward causes the shoulder 115 of the groove 114 to impinge against the pin 112 which operation will cause the short arm 113 to tip up and the long arm 106 to tip backward, these two arms turning on the pivot 116 attached to the fixed standard 103, see Fig. 7.

As the wheels 58 move around carrying the cartridge charged cannon with them, it is necessary to provide means for preventing the cartridge from dropping out before it is desired. To this end I provide covers or casings 117, two on each cannon hinged at 118 and springs 119 for keeping them in their closed position, when desired. Secured to the pivot 118 is a link 120, pivotally secured at its other end to the block 121 which travels in the irregular groove 122 of the circular frame 77. The link 120 is held in position by the arm 123, the latter being pivotally secured to the block 121 at one end and at the other end pivoted at 124 to the stud 125 on the wheel 58. It will be seen that as the implement advances the operation of the just above described parts will close the covers 117 over the cartridges, see right hand side of Fig. 1, and prevent the cartridges from leaving the cannon as the latter descends to the lower position shown in this figure; when it has reached this lowermost position, it is necessary to open to expose the cartridge against the soil and the groove 122 serves, in response to this necessity, to draw the covers 117 up and back and effect this exposure.

While the plow members 71 are usually sufficiently effective in assisting traction I provide supplementary spokes 126 which render the traction of wheel 58 still more effective.

As before stated when the high explosive cartridge functions and the surrounding soil is disturbed it is generally necessary to fill up the hole created thereby, that is to partially fill it, so as to provide the requisite receptacle for the seed.

To accomplish this to the right degree, I provide a cultivator blade 127; this is secured to the yoke arm 128 which extends rearwardly from the axle 59 and is journaled around same at 129 and 130 suitable bearings 131 being provided; specifically the cultivator blade 127 is mounted on the shaft 132 journaled at both ends 133 in the yoke-arm 128; wheels 134 also mounted and turning with the shaft 132 are provided to regulate to some extent the penetration of the cultivator blade 127; this blade shovels the soil into the opening caused by the explosion, the depth of which is indicated by the curved dotted line Y, Fig. 1, and as the blade passes and partially fills in, it leaves an opening or receptacle O of a depth suitable for the reception of the seed.

In connection with the above I employ seed planters which may be of the ordinary construction. At 135 I show bins containing the seed; the means for conveying the seed from the bin to the collapsible spot 136 are well known in the art and need not be specifically described; an operating sprocket wheel 137 driven by the chain 65 and mounted on any suitable shaft is shown; suitable means also well known are provided for dropping the seed periodically in the openings O; coverers or cultivators 138, one on each side follow the planter and cover up the seed; the cultivators are shown near rear extensions 139 of the yoke-arm 128 and are attached to extensions 140 of frame 10; the seed when so positioned in the soil and by the foregoing instrumentalities is shown at S in Figs. 1 and 5; I have thus shown and described a complete organizer implement for carrying my invention into effect.

The special instrumentalities herein shown may be varied in many ways as the appended claims are founded upon a novel process, the means employed to carry such process into practical effect being capable of wide differentiation; a basic fact of my invention is the periodic deposition of the high explosive, the regularly spaced explosive or gas expanding charges and I thereby, with its necessarily associated features, evolve a science upon which this newly created and very important art may be built.

Another way of introducing the high explosive in the soil would be by a strand which could be laid in the soil in any suitable way, as in a furrow and then firing same at any desired time, months afterward if necessary, always providing that the strand could be suitably protected from the elements so that its desirable qualities would not be impaired.

Or such strand could in addition to the explosive be furnished with fertilizing material which could be liberated in the soil when the explosion took place; or in place of the fertilizer or in conjunction with it if desired I could associate the seed, such as wheat which could be liberated to the soil when the explosion took place.

In this way large areas could be treated and the strands with their contained elements lie inactive until the desired time, when from a central station say, the entire field could be planted in a moment by releasing the seed to the soil in the manner just described.

Manifold other means can be devised for utilizing a systematic and periodic deposition of sealed high explosive packages for tillage purposes.

It is manifest that while I have particularly described my invention as applicable to agricultural purposes it can with equal facility be used in the formation of irrigation and drainage projects such as ditching, the making of irrigation laterals and forming drainage supply channels; it can also be used for military purposes as where a field can be treated and mined, such mines being subsequently exploded.

I claim—

1. The process of soil treatment consisting in progressively inserting successive definite and regularly spaced gas expanding bodies beneath the soil surface during an uninterrupted traversing movement.

2. The process of soil treatment consisting of progressively inserting definite and regularly spaced expandible bodies during an uninterrupted traversing movement and releasing the bodies in an expanding state beneath the soil.

3. The process of soil treatment consisting in progressively inserting definite and regularly spaced gas expanding charges beneath the soil surface during an uninterrupted traversing movement and subsequently releasing the charges successively.

4. The process of soil treatment consisting in progressively inserting definite and regularly spaced explosive charges beneath the soil surface during an uninterrupted traversing movement and substantially exploding the charges successively.

5. The process of soil treatment consisting in progressively inserting definite and regularly spaced explosive charges beneath the soil surface during an uninterrupted traversing movement and subsequently during the same traverse exploding the charges successively.

6. The art of agriculture consisting in progressively inserting definite and regularly spaced explosive charges beneath the soil surface during an uninterrupted traversing movement, subsequently exploding the charges successively and planting seed in the loosened soil during the same traverse.

7. The process of soil treatment consisting in progressively loosening the top or surface soil, inserting definite and regularly spaced gas expanding charges in the sub-soil during an uninterrupted movement and subsequently releasing the charges successively.

8. The art of agriculture consisting in progressively releasing definite and regularly spaced gas expanding bodies in a state of expansion beneath the soil surface during an uninterrupted traversing movement and subsequently planting seed in the loosened soil during the same traverse.

9. The art of agriculture consisting in progressively loosening the top or surface soil, inserting definite and regularly spaced gas expanding charges in the sub-soil during an uninterrupted traversing movement, releasing the charges successively, and finally planting seed in the loosened soil during the same traverse.

10. The art of agriculture consisting in progressively loosening the top or surface soil, inserting definite and regularly spaced gas expanding charges in the sub-soil during an uninterrupted traversing movement, releasing the charges successively, depositing the seed in the loosened soil and finally and during the same traverse covering the deposited seed.

11. An apparatus for treating the soil embodying a suitable vehicle, a container carried by said vehicle for holding unexpanded gas expanding charges and means for continuously and automatically discharging these charges in an expanded state beneath the surface of the soil.

12. An apparatus for treating the soil embodying a suitable vehicle, a container carried by said vehicle for holding gas expanding charges, means for continuously and automatically introducing said charges beneath the surface of the soil, and automatically operating means for subsequently releasing said charges successively.

13. An apparatus for treating soil comprising continually operating means for forming regularly spaced orifices in the soil, means for automatically placing explosive charges in said orifices and means for automatically exploding said charges successively.

14. An agricultural apparatus comprising continuously operating means for forming regularly spaced orifices in the soil, means for automatically placing explosive charges in said orifices, means for automatically exploding said charges successively and mechanism for planting seed in the loosened soil.

15. An agricultural apparatus comprising means for loosening the surface soil, continuously operative means for forming regularly spaced orifices in the sub-soil, means for automatically placing explosive charges in said orifices, means for automatically exploding said charges successively, mechanism for placing seed in the soil loosened by the explosive charges, and means for covering the deposited seed.

HERBERT KNIGHT.